United States Patent
Nakabayashi et al.

(10) Patent No.: US 7,108,787 B2
(45) Date of Patent: Sep. 19, 2006

(54) MODIFIED HOLLOW-FIBER MEMBRANE

(75) Inventors: Nobuo Nakabayashi, Chiba (JP); Kazuhiko Ishihara, Tokyo (JP); Shinji Miyazaki, Nobeoka (JP); Kazuo Imamura, Fujisawa (JP); Ken Suzuki, Tsukuba (JP); Koji Kamenosono, Nishinomiya (JP)

(73) Assignee: NOF Corporation, Tokyo (JP)

( * ) Notice: Subject to any disclaimer, the term of this patent is extended or adjusted under 35 U.S.C. 154(b) by 106 days.

(21) Appl. No.: 10/343,014

(22) PCT Filed: Jul. 27, 2001

(86) PCT No.: PCT/JP01/06487

§ 371 (c)(1),
(2), (4) Date: Jun. 2, 2003

(87) PCT Pub. No.: WO02/09857

PCT Pub. Date: Feb. 7, 2002

(65) Prior Publication Data
US 2004/0045897 A1    Mar. 11, 2004

(30) Foreign Application Priority Data
Jul. 27, 2000    (JP) .............................. 2000-227448

(51) Int. Cl.
*B01D 69/08*    (2006.01)
*B01D 63/02*    (2006.01)
*B01D 63/06*    (2006.01)

(52) U.S. Cl. .......................... 210/500.23; 210/500.24; 264/639; 264/634

(58) Field of Classification Search .......... 210/500.23, 210/500.24
See application file for complete search history.

(56) References Cited

U.S. PATENT DOCUMENTS

| | | | | |
|---|---|---|---|---|
| 5,104,729 A | * | 4/1992 | Stedronsky | 428/304.4 |
| 5,368,733 A | * | 11/1994 | Nakabayashi et al. | 210/500.23 |
| 6,204,324 B1 | * | 3/2001 | Shuto et al. | 524/807 |

FOREIGN PATENT DOCUMENTS

| | | |
|---|---|---|
| JP | 5-177119 | 7/1993 |
| JP | 7-231935 | 9/1995 |
| JP | 2000037617 A * | 2/2000 |

* cited by examiner

*Primary Examiner*—Krishnan S. Menon
(74) *Attorney, Agent, or Firm*—Young & Thompson

(57) ABSTRACT

A modified hollow-fiber membrane which has improved surface hydrophilicity without increasing the amount of components released therefrom, is less apt to interact with living-body components, does not adsorb proteins, and is less apt to deteriorate in performance. The hollow-fiber membrane has a copolymer of 2-methacryloyloxyethylphosphorylcholine and other polymerizable vinyl monomer held on a surface of the membrane, the copolymer being present on the surface in a higher concentration than in other parts of the membrane. The modified hollow-fiber membrane is useful in medical applications such as hemodialysis and blood filtration and in the medical industry, food industry etc.

15 Claims, No Drawings

MODIFIED HOLLOW-FIBER MEMBRANE

TECHNICAL FIELD

The present invention relates to a hollow-fiber membrane with a modified membrane surface. More particularly, the present invention relates to a hollow fiber membrane of which the surface has been modified to control adsorption of proteins onto the surface or to suppress interaction of blood components on the surface, and to a method for preparing the hollow-fiber membrane. The hollow fiber membrane of the present invention can be used as a membrane for medical treatment suitable for purification of blood such as hemodialysis and blood filtration or as a permselective membrane used in the pharmaceutical industry or the food industry.

BACKGROUND ART

Hollow fiber membranes made from various materials are widely used as permselective membranes for medical applications such as hemodialysis and blood filtration, as well as for the pharmaceutical industry, food industry, and the like. The hollow fiber membranes used in such applications must have superior mechanical strength and chemical stability, possess easily controllable permeability, release a minimal amount of materials, exhibit almost no interaction with biological components, and be safe for living bodies. However, there have been no hollow fiber membranes completely satisfying all of these requirements.

When the material is a synthetic polymer, for example, the surface is generally hydrophobic. Unduly weak hydrophilic properties tend to cause the material to react with blood components, cause the blood to easily coagulate, and impair the permeability performance of the hollow fiber membrane due to adsorption of protein components. A study for providing the hollow fiber membrane made from such a synthetic polymer with compatibility with blood by incorporating a polymer with hydrophilic properties has been undertaken. For instance, a permselective membrane made from a polysulfone-based polymer with a hydrophilic polymer incorporated therein and a method of manufacturing such a membrane have been proposed. Such a membrane, however, exhibits only poor wetting properties and tends to coagulate blood due to decreased compatibility with blood, if the content of the hydrophilic polymer is small. On the other hand, if the content of the hydrophilic polymer is large, the amount of the hydrophilic polymer dissolved from the membrane increases, although the blood coagulation can be suppressed.

Japanese Patent Applications Laid-open No. S61-238306 and No. S63-97666 disclose a method for preparing a polysulfone-based separation membrane in which a membrane-forming raw material solution contains a polysulfone-based polymer, a hydrophilic polymer, and an additive acting as a non-solvent or a swelling agent on the polysulfone-based polymer. These patents, however, do not describe a method for reducing dissolution of hydrophilic polymers. Japanese Patent Applications Laid-open No. S63-97205, S63-97634, and H04-300636 disclose a method of reducing dissolution of hydrophilic polymers from the polysulfone-based separation membrane prepared by the above method by insolubilizing the hydrophilic polymers by means of a radiation treatment and/or a heat treatment of the membrane. However, this method may impair compatibility of the membrane with blood, possibly due to the insolubility of the hydrophilic polymer caused by cross-linking. The membrane obtained by this method contains the hydrophilic polymer in thick membrane areas (inner parts of membrane) as well, precluding the thick membrane areas from exhibiting required hydrophobicity.

Japanese Patent Applications Laid-open No. S61-402 and S62-38205 disclose membranes containing a hydrophilic polymer only in the dense layer side. Japanese Patent Application Laid-open No. H04-300636 discloses a membrane containing polyvinyl pyrrolidone present in a higher concentration in the inner surface side than in other parts of the hollow fiber membrane. There patents, however, only describe that the hydrophilic polymers are present near the surface of the membrane coming into contact with blood, but do not describe any specific properties of the polymers. In addition, no sufficient hydrophobicity can be obtained in the thick membrane areas of these hollow fiber membranes.

Several researches are being undertaken with an objective of providing hollow fiber membranes with superior biological compatibility by modifying the polymers so that the surface has not only hydrophilic properties but also a structure similar to a biomembrane. Specifically, one such research contemplates improvement of biocompatibility of hollow fiber membranes by incorporating a copolymer of 2-methacryloyloxyethyl phosphorylcholine and other monomers having a structure similar to phospholipids, major components forming biomembranes, into synthetic polymer hollow fiber membranes.

Japanese Patent Application Laid-open No. H10-296063 discloses a polysulfone-based porous membrane and a method of manufacturing the same. The porous membrane is produced using a mixed solution of a copolymer of 2-methacryloyloxyethyl phosphorylcholine and other monomers and a polysulfone as a membrane-forming raw material solution. The membrane obtained by this method, however, contains the copolymer of 2-methacryloyloxyethyl phosphorylcholine and other monomers in thick membrane areas (inner parts of membrane) as well, precluding the thick membrane areas from exhibiting hydrophobicity. In addition, the copolymer may be dissolved or desorbed from the membrane. Incompatibility of the copolymer and the polysulfone resin is another problem which limits the composition of the solvent used for preparing the mixed solution.

Japanese Patent Application Laid-open No. H05-177119 discloses a membrane produced by coating the surface of a porous membrane made from polyolefin or polyolefin fluoride with a copolymer of 2-methacryloyloxyethyl phosphorylcholine and methacrylate. However, a large amount of the copolymer, for example, an amount equivalent to 30% or more, preferably 50% or more, of the pore surface of the porous membrane possessing 20 vol % or more void ratio, must be covered to obtain a sufficient effect. This causes the copolymer of 2-methacryloyloxyethyl phosphorylcholine and methacrylate to be also coated over the pore surface inside the hollow fiber membrane, precluding the thick membrane areas from exhibiting hydrophobicity. In addition, the copolymer may be dissolved or desorbed from the membrane.

More recently, diversified and sophisticated functions have been demanded of membranes. In the field of artificial dialysis, for example, countercurrent invasion of endotoxin from the dialysis fluid side caused by high performance membranes has been pointed out. To overcome this problem, development of a high performance membrane capable of eliminating endotoxin and exhibiting no interaction with blood components is desired.

DISCLOSURE OF THE INVENTION

An object of the present invention is to provide a hollow fiber membrane with a surface structure similar to the structure of biomembranes, with a surface exhibiting only small interaction with biological components, not adsorbing proteins, being free from deterioration in performance, and excelling in biocompatibility.

Another object of the present invention is to provide a hollow fiber membrane which can adsorb and trap foreign matters such as endotoxin countercurrently flowing from outside the hollow fiber in the thick membrane areas.

The inventors of the present invention have conducted extensive studies to achieve the above objects. As a result, the inventors have found that one of these objects can be achieved if a copolymer of 2-methacryloyloxyethyl phosphorylcholine (hereinafter referred to as "MPC") and other vinyl-polymerizable monomers (the copolymer is hereinafter referred to as "MPC copolymer") is held on the surface of the hollow fiber membrane so that the MPC copolymer is present in a larger concentration than in the other parts of the membrane. This finding has led to the completion of the present invention.

Specifically, the present invention provides a modified hollow fiber membrane made from a synthetic polymer selected from the group consisting of polysulfone-based polymers, polycarbonate-based polymers, polyamide-based polymers, polyvinyl chloride-based polymers, polyvinyl alcohol-based polymers, polyallylate-based polymers, polyacrylonitrile-based polymers, polyether-based polymers, polyester-based polymers, polyurethane-based polymers, polyacrylate-based polymers, polyolefin-based polymers, and fluorinated polyolefin-based polymers, and mixtures of these polymers, the hollow fiber membrane being modified with a copolymer of MPC and other vinyl-polymerizable monomers which is present on inside and/or outside surface of the hollow fiber membrane in a larger concentration than in the other parts of the membrane.

The inventors have further found that the above other object can be achieved by forming the thick membrane areas of the hollow fiber membrane from a synthetic polymer having a contact angle in the range of 50° to 100°.

The present invention further provides a method of preparing a modified hollow fiber membrane comprising, in a dry and wet spinning method comprising simultaneously discharging a hollow space inner solution from the inner side of double spinning nozzles and a synthetic polymer solution from the outer side of the double spinning nozzles and immersing the spun yarns in a coagulation bath located below the spinning nozzles, characterized by using a solution prepared by dissolving 0.001–10 wt % of an MPC copolymer as the hollow space inner solution and/or as a coagulation bath solution. The present invention further provides a method of preparing a modified hollow fiber membrane comprising passing a solution of 0.001–10 wt % of MPC copolymer through a hollow space of hollow fiber membrane made from a synthetic polymer and/or the outer side of the hollow fiber membrane, thereby causing the copolymer to be adsorbed onto the surface of the hollow fiber membrane.

The present invention will be explained in more detail in the following description, which is not intended to be limiting of the present invention.

Synthetic polymers used as raw materials for the hollow fiber membrane of the present invention include polysulfone-based polymers, polycarbonate-based polymers, polyamide-based polymers, polyvinyl chloride-based polymers, polyvinyl alcohol-based polymers, polyallylate-based polymers, polyacrylonitrile-based polymers, polyether-based polymers, polyester-based polymers, polyurethane-based polymers, polyacrylate-based polymers, polyolefin-based polymers, and fluorinated polyolefin-based polymers, and mixtures of these polymers. The term "-based polymers" used in the present invention indicates that the polymers include not only homopolymers but also copolymers. Any monomers can be used as the components for the copolymers inasmuch as the resulting copolymers retain the characteristics of their base polymer.

Specific examples of the polymers include polysulfone, polyether sulfone, polyarylether sulfone, polyallylate-polyether sulfone-polymer alloy, polycarbonate, polyvinyl chloride, vinyl chloride-vinyl acetate copolymer, ethylene-vinyl alcohol copolymer, polyethylene terephthalate, polybuthylene terephthalate, polyamide 6, polyamide 66, polyacrylonitrile, poly(methyl acrylate), poly(butyl acrylate), polyethylene, polypropylene, poly-4-methylpentene-1, polyvinylidene fluoride, and the like.

In addition, a synthetic polymer having a contact angle in the range of 50° to 100° is used as a material for forming the thick membrane areas of the hollow fiber membrane to achieve the object of the present invention. The contact angle as used in the present invention is a contact angle with water and can be determined by forming a flat plate from the synthetic polymer used for the thick membrane areas, placing a water drop on the surface, and measuring the angle made by the synthetic polymer and the water surface. The lower the water contact angle, the higher the hydrophilic properties; and the higher the water contact angle, the higher the hydrophobic properties. When the synthetic polymer forming the thick membrane areas is a polymer mixture, at least the major polymer component forming the thick membrane areas must have a contact angle between 50° and 100°.

Endotoxin which is a pollutant in dialysis fluids has a lipid A site, a structure derived from a fatty acid, and tends to be adsorbed on the surface of hydrophobic polymers due to the hydrophobic properties of this site. Since foreign matters such as endotoxin contained in the dialysis fluid on the outside surface side of hollow fiber membrane can be efficiently adsorbed by forming the thick membrane areas from a synthetic polymer having a contact angle of 50° to 100°, pollution of blood due to reverse permeation of endotoxin to the inside surface side can be prevented. If the contact angle is greater than 100°, the adsorptive activity of blood proteins tends to change. Therefore, the major raw material for the membrane forming the thick membrane areas preferably has a contact angle between 50° and 100°.

Any synthetic polymers having a contact angle of this range and capable of forming a hollow fiber membrane can be used as raw materials in the present invention. Examples include polysulfone-based polymers, polycarbonate-based polymers, polyvinyl chloride-based polymers, polyallylate-based polymers, polyether-based polymers, polyester-based polymers, polyurethane-based polymers, polyacrylate-based polymers, polyolefin-based polymers, and fluorinated polyolefin-based polymers, and mixtures of these polymers. The term "-basedpolymers" used here indicates that the polymers include not only homopolymers but also copolymers. Any monomers can be used as the components for the copolymers inasmuch as the resulting copolymers retain the characteristics of their base polymer.

Specific examples of the polymers include polysulfone, polyether sulfone, polyarylether sulfone, polyallylate-polyether sulfone-polymer alloy, polycarbonate, polyvinyl chloride, vinyl chloride-vinyl acetate copolymer, polyethylene terephthalate, polybuthylene terephthalate, poly(methyl acrylate), poly(butyl acrylate), polyethylene, polypropylene, poly-4-methylpentene-1, polyvinylidene fluoride, and the like.

As the other vinyl-polymerizable monomer for forming copolymers with MPC, one or more vinyl-polymerizable monomers selected from the group consisting of vinyl pyrrolidone, styrene, and (meth)acrylate derivatives can be used. The (meth)acrylate derivatives preferably used as vinyl-polymerizable monomers include the compounds of the following formulas (1), (2), or (3),

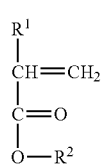

(1)

wherein $R^1$ is a hydrogen atom or a methyl group and $R^2$ is a hydrogen atom or an aliphatic or aromatic hydrocarbon group having 1–20 carbon atoms.

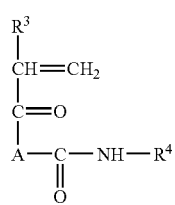

(2)

wherein $R^3$ is a hydrogen atom or a methyl group, $R^4$ is a hydrogen atom or an aliphatic or aromatic hydrocarbon group having 1–20 carbon atoms, and A indicates O or $OR^5O$, wherein $R^5$ is a substituted or unsubstituted alkylene group having 1–10 carbon atoms,

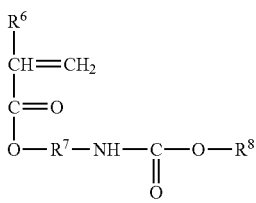

(3)

wherein $R^6$ is a hydrogen atom or a methyl group, $R^8$ is a hydrogen atom or an aliphatic or aromatic hydrocarbon group having 1–20 carbon atoms, and $R^7$ is a substituted or unsubstituted alkylene group having 1–10 carbon atoms.

Suitable monomers are selected according to the characteristics desired for the copolymer.

As specific compounds, butyl methacrylate, benzyl methacrylate, methacryloyloxyethyl phenylcarbamate, phenyl methacryloyloxyethyl carbamate, and the like can be given.

If the monomer unit content of MPC in the copolymer, which is the ratio of MPC (A mols) to the total of MPC (A mols) and other vinyl-polymerizable monomer components (B mols), A/(A+B), is small, the copolymer tends to exhibit insufficient biocompatibility and hydrophilic properties. If the MPC monomer unit content is large, on the other hand, the copolymer exhibits increased solubility in water and decreased solubility in organic solvents, resulting in an increase in the amount of membrane materials dissolved in water or other problems such as limited application of the hollow fiber membrane. For this reason, the monomer unit content of MPC in the present invention is preferably from 0.05 to 0.95, and more preferably from 0.1 to 0.5.

Although the biocompatibility on the surface of the hollow fiber membrane of the present invention is affected by the type of vinyl-polymerizable monomers copolymerized with MPC and the MPC monomer unit content, the biocompatibility is basically determined by the amount of MPC present on the membrane surface. Such an amount of MPC monomer units can be determined by analyzing the surface of hollow fiber membrane by X-ray photoelectron spectroscopy. Since the ratio of elements present near the surface can be determined by the X-ray photoelectron spectroscopy, the MPC monomer unit concentration (the weight of MPC monomer unit/the weight of membrane) near the surface can be calculated from the chemical formula of the MPC copolymer and the chemical formula of polymer forming the membrane. Since this is the concentration near the surface of the membrane, the value is employed as the MPC monomer unit concentration on the membrane surface. The MPC monomer unit concentration on the membrane surface determined in this manner is preferably 5 wt % or more, and more preferably 8 wt % or more for the hollow fiber membrane to exhibit biocompatibility. To increase the MPC monomer unit concentration on the membrane surface, not only the concentration of MPC monomer unit in the copolymer but also the concentration of MPC copolymer per unit weight of membrane must be increased. This leads to an increase in the amount of dissolved materials. Therefore, the MPC monomer unit content is preferably 50 wt % or less, and more preferably 40 wt % or less.

The MPC copolymer may be present in a concentration higher than the other part of the membrane either on the inside surface or the outside surface, or on both surfaces of the hollow fiber membrane. The surface on which the MPC copolymer is present in a higher concentration than in other parts of the hollow fiber membrane is suitably selected according to the application or the manner of use of the hollow fiber membrane.

In the hollow fiber membrane described in Japanese Patent Application Laid-open No. H05-177119, MPC copolymer not only covers porous surface of the porous hollow fiber membrane, but also is present on the porous surface of inner parts of membrane (thick membrane areas). On the other hand, in the present invention the amount of MPC copolymer present in pores in the inner parts of membrane (thick membrane areas) should be as small as possible, but the MPC copolymer should be unevenly distributed only on the surface of the hollow fiber membrane.

The MPC copolymer can be unevenly distributed on the surface of the membrane by adjusting the molecular weight of the MPC copolymer held on the surface or by adjusting the membrane structure such as a void ratio, pore diameter, and the like of the hollow fiber membrane.

Because the MPC copolymer is unevenly distributed on the surface of the membrane in the present invention, the concentration of the MPC monomer unit on the surface of the hollow fiber membrane can be maintained sufficiently high, notwithstanding a very small concentration of the MPC copolymer per unit weight of the membrane (bulk concentration) The bulk concentration may be in the range of 0.001–1.0 wt %, preferably 0.05–0.5 wt %. The bulk concentration of MPC copolymer can be determined by preparing a sufficiently washed and dried sample of hollow fiber membrane and analyzing fragments derived from MPC in this sample by pyrolysis gas chromatography.

The MPC copolymer is used as a solution in manufacturing the hollow fiber membrane of the present invention. The MPC copolymer may have as high molecular weight as possible as long as the polymer is dissolved in the solvent without problem. If the molecular weight is too small, the MPC copolymer tends to liquate out or be released from the membrane. In manufacturing the hollow fiber membrane of the present invention, the solution of MPC copolymer is caused to come into contact with the material of the membrane from the inside and/or outside surfaces of the hollow fiber membrane. If the molecular weight of the MPC copolymer is too small, the MPC copolymer is diffused in the membrane so that the MPC copolymer is incorporated all over the membrane. Thus, the MPC copolymer with such a small molecular weight cannot achieve the feature of the present invention that the hydrophilic property polymer is unevenly distributed over the inside and/or outside surfaces of the membrane. For these reasons, the MPC copolymer has a molecular weight preferably 5,000 or more, and more preferably 10,000 or more.

In manufacturing the hollow fiber membrane of the present invention, the solution of MPC copolymer may be caused to come into contact with the material of the membrane from the inside and/or outside surfaces of the hollow fiber membrane, thereby causing the MPC copolymer to be held on the inside and/or outside surfaces. The resulting hollow fiber membrane has a structure with a dense layer on the membrane surface on which the MPC copolymer is held. If the MPC copolymer molecule is large enough to preclude dispersion of the copolymer into the pores in membrane, the amount of the MPC copolymer incorporated into the inner parts of membrane (thick membrane areas) can be minimized. Form this point of view, it is preferable that the hollow fiber membrane of the present invention have a structure with a dense layer on the membrane surface on which the MPC copolymer is held.

The hollow fiber membrane of the present invention having thick membrane areas made from a synthetic polymer having a contact angle in the range of 50° to 100° can adsorb and trap foreign matters such as endotoxin countercurrently flowing from outside the hollow fiber. For this reason, the thick membrane areas preferably have a porous structure with developed networks rather than a finger void structure having independent large voids. To obtain hollow fiber membrane with such a structure, additives such as tetraethylene glycol, polyvinyl pyrrolidone, and the like can be added to the raw material solution for forming the membrane.

As described above, the hollow fiber membrane can be modified in the present invention by unevenly distributing the MPC copolymer on the membrane surface. Such a hollow fiber membrane can be obtained by a method of causing the MPC copolymer adsorbed on the surface of a previously manufactured hollow fiber membrane, as mentioned above, or by a method of unevenly distributing the MPC copolymer on the membrane surface when the membrane is manufactured.

A conventionally known dry and wet spinning method can be used for unevenly distributing the MPC copolymer on the membrane surface when the membrane is manufactured. Specifically, a raw material fluid for the preparation of membrane and an hollow space inner fluid are simultaneously discharged from tube-in-orifice type double spinning nozzles, spun yarns are caused to run in air, and immersed in a coagulation bath containing water as a major coagulation medium installed under the spinning nozzles. The coagulated yarns are wound around a reel. The wound hollow fiber membrane is washed to remove excessive additives and solvents. Glycerin is added as required, followed by drying by dry heating and the like to obtain a hollow fiber membrane. To unevenly distribute the MPC copolymer on the inner surface during the manufacture of membrane, an MPC copolymer solution is used as a hollow space inner solution. To unevenly distribute the MPC copolymer on the outer surface, on the other hand, the MPC copolymer solution is used as a coagulating solution.

The hollow fiber membrane obtained by these methods release only a very small amount of eluted materials. This is thought to be the result of the following mechanism of membrane structure formation. Specifically, the membrane-forming raw material solution and hollow space inner solution in which the MPC polymer is dissolved are brought to come into contact at the moment when these solutions are discharged from spinning nozzles. This causes the membrane-forming raw material solution to coagulate, while the MPC polymer is entangled with molecular chains of the synthetic polymer forming the hollow-fiber membrane or incorporated into dense structures near the inner surface, thereby firmly immobilizing the MPC polymer. Absence of extra MPC polymer inside the membrane is also thought to contribute to the very small amount of eluted materials.

This method can be applied to any synthetic polymer which can be prepared into membranes by the dry wet spinning method. A polymer solution in which a synthetic polymer used as a membrane-forming material and additives are uniformly dissolved in a solvent is used as the membrane-forming raw material solution. A non-solvent for the synthetic polymer or a mixture of such as a non-solvent and a solvent can be used as a hollow space inner solution which forms hollow areas. The performance of the obtained hollow-fiber membrane is generally controlled by the ratio of the non-solvent and the solvent in the hollow space inner solution. Such a ratio is determined according to the object of application.

As an MPC copolymer, a copolymer soluble in the hollow space inner solution and/or coagulating bath solution can be selected and used.

The concentration of the MPC copolymer in the hollow space inner solution and/or coagulating bath solution in the range of 0.001–10 wt % is sufficient for attaching the MPC copolymer to the membrane surface necessary for the hollow-fiber membrane to exhibit biocompatibility, with the range of 0.01–5 wt % being more preferable.

Various known methods of manufacturing hollow-fiber membranes can be used for previously preparing the hollow-fiber membrane to be modified. Any synthetic polymers to which these membrane-forming methods are applicable can be used as the material for forming the hollow-fiber membrane. In this method, a solution for adsorption treatment prepared by dissolving the MPC copolymer in a suitable solvent is caused to come into contact with the membrane surface on which the MPC copolymer should be unevenly distributed, thereby causing the MPC copolymer to be adsorbed. The MPC copolymer can be adsorbed using any appropriate method such as a method of immersing the hollow fiber into the adsorbed solution, a method of passing the adsorbed solution through the hollow space or outside the hollow-fiber membrane, or a method of encapsulating the adsorbed solution into the hollow space or outside the hollow-fiber membrane. After that, excess copolymer and solvent are removed by washing. Then, the product is dried, if necessary. These processing can be carried out either in the module step when the hollow fiver has been formed or in the step before formation of the hollow fiber. The concentration of the MPC copolymer in the adsorbed solution in the range of 0.001–10 wt % is sufficient for attaching the MPC copolymer to the membrane surface necessary for the hollow-fiber membrane to exhibit biocompatibility, with the range of 0.01–5 wt % being more preferable.

BEST MODE FOR CARRYING OUT THE INVENTION

The present invention will now be described in more detail by way of working examples and test examples, which should not be construed as limiting the present invention.

(Measurement of Amount of Eluted Materials)

1.5 g of hollow fiber membrane was put into 150 ml of distilled water and heated at 70° C. for one hour to obtain an extract. UV radiation absorbance of the extract at a wavelength of 220–350 nm was measured using distilled water heated at 70° C. for one hour without adding the hollow fiber membrane as a control. The amount of eluted materials is indicated by the highest value of absorbance in the wavelength range of 220–350 nm.

EXAMPLE 1

18 parts of polysulfone ("Ultrason S3010" manufactured by BASF) was added to a mixture of 57 parts of N,N-dimethylacetamide (DMAC) and 25 parts of tetraethylene glycol (TEG). The mixture was stirred for 6 hours at 60° C. and dissolved to obtain a membrane-forming raw material solution. The raw material solution maintained at a temperature of 45° C. was discharged from spinnerets with an annular orifice together with a 40% aqueous solution of DMAC, to which 1% of a copolymer of MPC and methacryloyloxyethyl phenyl carbamate (MPC monomer unit content=0.31, molecular weight=109,000) was added as an internal coagulate solution. The spun raw material was passed through a water bath, placed 36 cm lower than the discharge nozzle, at 55° C. to be wound around a reel, and washed with hot water at 90° C. to remove any excess copolymer and the solvent. The resulting hollow fiber membrane was confirmed to have a water permeability of 325 ml/m$^2$·mmHg·hr, an MPC copolymer concentration on the inner side surface of 13 wt %, and a bulk concentration of 0.25 wt %. The absorbance of the extract obtained from the hollow fiber membrane determined by the elusion material measurement method was 0.020.

EXAMPLE 2

A hollow fiber membrane was prepared in the same manner as in Example 1, except for using a 40% aqueous solution of DMAC, to which 1% of a copolymer of MPC and butyl methacryate (MPC monomer unit content=0.40, molecular weight=122,000) was added as an internal coagulate solution. The resulting hollow fiber membrane was confirmed to have a water permeability of 299 ml/m$^2$·mmHg·hr, an MPC copolymer concentration on the inner side surface of 18 wt %, and a bulk concentration of 0.2 wt %. The absorbance of the extract obtained from the hollow fiber membrane determined by the elusion material measurement method was 0.025.

EXAMPLE 3

A hollow fiber membrane was prepared in the same manner as in Example 1, except for using a 40% aqueous solution of DMAC, to which 1% of a copolymer of MPC and phenyl methacryloyloxyethyl carbamate (MPC monomer unit content=0.28, molecular weight=160,000) was added as an internal coagulate solution. The resulting hollow fiber membrane was confirmed to have a water permeability of 280 ml/m$^2$·mmHg·hr, an MPC copolymer concentration on the inner side surface of 15 wt %, and a bulk concentration of 0.3 wt %. The absorbance of the extract obtained from the hollow fiber membrane determined by the elusion material measurement method was 0.018.

EXAMPLE 4

A hollow fiber membrane was prepared in the same manner as in Example 1, except for using a 40% aqueous solution of DMAC, to which 1% of a copolymer of MPC and benzyl methacryate (MPC monomer unit content=0.29, molecular weight=132,000) was added as an internal coagulate solution. The resulting hollow fiber membrane was confirmed to have a water permeability of 310 ml/m$^2$·mmHg·hr, an MPC copolymer concentration on the inner side surface of 14 wt %, and a bulk concentration of 0.25 wt %. The absorbance of the extract obtained from the hollow fiber membrane determined by the elusion material measurement method was 0.019.

EXAMPLE 5

A hollow fiber membrane was prepared in the same manner as in Example 1, except for using a 40% aqueous solution of DMAC as an internal coagulate solution. The resulting hollow fiber membrane was dipped into a 40% aqueous solution of ethanol, to which 1% of a copolymer of MPC and phenyl methacryloyloxyethyl carbamate (MPC monomer unit content=0.31, molecular weight=109,000) was added, to adsorb the MPC copolymer. Then, the hollow fiber membrane was washed with hot water at 90° C. to remove any excess copolymer and ethanol. The resulting hollow fiber membrane was confirmed to have a water permeability of 330 ml/m$^2$·mmHg·hr, an MPC copolymer concentration on the inner side surface of 12 wt %, and a bulk concentration of 0.4 wt %. The absorbance of the extract obtained from the hollow fiber membrane determined by the elusion material measurement method was 0.015.

EXAMPLE 6

18 parts of polysulfone ("Ultrason S3010" manufactured by BASF) and 3 parts of polyvinyl pyrrolidone ("Plasdone K90" manufactured by ISP) were added to 79 parts of DMAC. The mixture was stirred for 6 hours at 60° C. and dissolved to obtain a membrane-forming raw material solution. The raw material solution maintained at a temperature of 45° C. was discharged from spinnerets with an annular orifice together with a 40% aqueous solution of DMAC, to which 1% of a copolymer of MPC and methacryloyloxyethyl phenyl carbamate (MPC monomer unit content=0.31, molecular weight=109,000) was added as an internal coagulate solution. The spun raw material was passed through a water bath, placed 36 cm lower than the discharge nozzle, at 55° C. to be wound around a reel, and washed with hot water at 90° C. to remove any excess copolymer and the solvent.

The resulting hollow fiber membrane was confirmed to have a water permeability of 142 ml/m²·mmHg·hr, an MPC copolymer concentration on the inner side surface of 17 wt %, and a bulk concentration of 0.1 wt %. The absorbance of the extract obtained from the hollow fiber membrane was 0.022.

EXAMPLE 7

A polyacrylonitrile-based synthetic polymer made from 92 parts of polyacrylonitrile, 6 parts of methyl acrylate, 1.5 parts of acrylic acid, and 0.5 part of methallylsulfonic acid was added to 79 parts of DMAC. The mixture was stirred for 6 hours at 60° C. and dissolved to obtain a membrane-forming raw material solution. The raw material solution maintained at a temperature of 45° C. was discharged from spinnerets with an annular orifice together with a 40% aqueous solution of DMAC, to which 1% of a copolymer of MPC and methacryloyloxyethyl phenyl carbamate (MPC monomer unit content=0.31, molecular weight=109,000) was added as an internal coagulate solution. The spun raw material was passed through a water bath, placed 36 cm lower than the discharge nozzle, at 55° C. to be wound around a reel, and washed with hot water at 90° C. to remove any excess copolymer and the solvent. The resulting hollow fiber membrane was confirmed to have a water permeability of 162 ml/m²·mmHg·hr, an MPC copolymer concentration on the inner side surface of 20 wt %, and a bulk concentration of 0.2 wt %. The absorbance of the extract obtained from the hollow fiber membrane determined by the elusion material measurement method, was 0.022.

EXAMPLE 8

High density polyethylene was melt-spun using spinnerets having an annular orifice at 165° C. The resulting non-drawn yarns were annealed on a roller heated at 115° C. and drawn at 25° C. (cold drawing) by 30% and at 80° C. (hot drawing) by 200%. The resulting hollow fiber membrane has a pore diameter of 0.01 μm. The resulting hollow fiber membrane was dipped into a 40% aqueous solution of ethanol, to which 1% of a copolymer of MPC and phenyl methacryloyloxyethyl carbamate (MPC monomer unit content=0.31, molecular weight=109,000) was added, to adsorb the MPC copolymer. Then, the hollow fiber membrane was washed with hot water at 90° C. to remove an excess amount of the MPC copolymer and ethanol. The resulting hollow fiber membrane was confirmed to have a water permeability of 562 ml/m²·mmHg·hr, an MPC copolymer concentration on the inner side surface of 13 wt %, and a bulk concentration of 0.2 wt %. The absorbance of the extract obtained from the hollow fiber membrane was 0.022.

COMPARATIVE EXAMPLE 1

A hollow fiber membrane was prepared in the same manner as in Example 1, except for using a 40% aqueous solution of DMAC as an internal coagulate solution. The resulting hollow fiber membrane was confirmed to have a water permeability of 957 ml/m²·mmHg·hr, an MPC copolymer concentration on the inner side surface of 0 wt %, and a bulk concentration of 0 wt %.

COMPARATIVE EXAMPLE 2

Next, as a Comparative Example a hollow fiber membrane was prepared according to the conventional method described in Japanese Patent Application Laid-open No. H05-177119.

High density polyethylene was melt-spun using spinnerets having an annular orifice at 165° C. The resulting non-drawn yarns were annealed on a roller heated at 115° C. and drawn at 25° C. (cold drawing) by 50% and at 110° C. (hot drawing) by 300%. The resulting hollow fiber membrane has a pore diameter of 0.3 μm. The resulting hollow fiber membrane was dipped into a 40% aqueous solution of ethanol, to which 1% of a copolymer of MPC and phenyl methacryloyloxyethyl carbamate (MPC monomer unit content=0.31, molecular weight=109,000) was added, to adsorb the MPC copolymer. Then, the hollow fiber membrane was washed with hot water at 90° C. to remove an excess amount of the MPC copolymer and ethanol. The resulting hollow fiber membrane was confirmed to have a water permeability of 1,620 ml/m²·mmHg·hr, an MPC copolymer concentration on the inner side surface of 18 wt %, and a bulk concentration of 2.5 wt %. The extract obtained from the hollow fiber membrane exhibited a high absorbance of 0.102.

TEST EXAMPLE 1

The ultra filtration rate (UFR) of bovine blood plasma was measured using the hollow fiber membrane obtained in Examples 1–8 and Comparative Example 1. Specifically, a miniature module was prepared by bundling 140 sheets of hollow fiber membrane with a length of 15 cm. Bovine blood plasma to which heparin was added (heparin 5000 IU/l, protein concentration: 6.5 g/dl) was heated to 37° C. and passed through the miniature module at a linear velocity of 0.4 cm/sec at a membrane pressure difference of 25 mmHg for 120 minutes to ultra filter the blood plasma. The filtrate was sampled at 15, 30, 60, and 120 minutes. The weight of the samples was measured to calculate the UFR. The results are shown in Table 1, which indicates that no performance deterioration of UFR was seen in the hollow fiber membranes with MPC copolymer unevenly distributed in the inner surface.

TABLE 1

| Hollow fiber membrane | UFR (ml/m² · mmHg · hr) | | | |
|---|---|---|---|---|
| | 15 min | 30 min | 60 min | 120 min |
| Example 1 | 41 | 42 | 41 | 42 |
| Example 2 | 39 | 39 | 38 | 39 |
| Example 3 | 37 | 38 | 38 | 38 |
| Example 4 | 42 | 42 | 41 | 42 |
| Example 5 | 43 | 44 | 43 | 43 |
| Example 6 | 36 | 35 | 37 | 35 |
| Example 7 | 28 | 29 | 28 | 29 |
| Example 8 | 46 | 45 | 48 | 45 |
| Comparative Example 1 | 30 | 28 | 23 | 18 |

TEST EXAMPLE 2

The permeability of endotoxin was measured using the hollow fiber membranes obtained in Examples 1–8 and Comparative Example 2. Specifically, a test solution with an endotoxin concentration of 100 ng/ml was caused to permeate through a module with a membrane area of 120 cm² from the dialysis fluid side to the blood side for 10 minutes at a rate of 5 ml/min. The filtrate was collected at the blood side outlet to detect endotoxin using an endotoxin detecting LAL reagent (a helmet crab corpuscle extract "HS-J" manufactured by Wako Pure Chemical Industries, Ltd.). As a result, no endotoxin was detected in the filtrates of the hollow fiber membranes obtained in Examples 1–8, whereas 12 ng/ml of endotoxin was detected in the filtrate of the hollow fiber membrane obtained in Comparative Example 2.

TEST EXAMPLE 3

The thrombocytes adhesion to the hollow fiber membranes obtained in Examples 1–8 and Comparative Example 1 was evaluated. Specifically, a miniature module was prepared by bundling 28 sheets of hollow fiber membrane with a length of 14 cm. 7 cc of fresh human blood to which heparin was added was passed through the module in 5 minutes, following which 10 cc of a physiological saline solution was caused to flow to remove blood. Next, the hollow fiber membrane was cut into short pieces of 2 to 3 mm in length, which were put into a physiological saline solution containing 0.5% Triton X-100 (polyoxyethylene (10) octylphenyl ether). The mixture was irradiated with supersonic waves. Isolated lactic acid dehydrogenase (LDH) was quantitatively determined. Since the LDH is an enzyme present in cell membranes and almost all cells adhering to the membrane surface have been confirmed to be thrombocytes by electron microscope observation, the determined LDH value was used for relative evaluation of thrombocytes adhered to the membrane surface. The results are shown in Table 2, which indicates that only a small amount of thrombocytes have adhered to the surface of the hollow fiber membranes with MPC copolymer unevenly distributed in the inner surface.

TABLE 2

| Hollow fiber membrane | LDH released from hollow fiber membrane (unit/m²) |
|---|---|
| Example 1 | 7.7 |
| Example 2 | 8.2 |
| Example 3 | 5.5 |
| Example 4 | 7.0 |
| Example 5 | 8.0 |
| Example 6 | 3.4 |
| Example 7 | 2.4 |
| Example 8 | 5.4 |
| Comparative Example 1 | 34 |

INDUSTRIAL APPLICABILITY

Because the hollow fiber membrane of the present invention comprises a copolymer of 2-methacryloyloxyethyl phosphorylcholine and other vinyl-polymerizable monomers unevenly distributed inside and/or outside the surface of the membrane, the membrane surface can be modified without increasing materials dissolved out from the membrane. Specifically, the membrane releases or dissolves out the least amount of materials, does not suffer from deterioration of its performance, activates thrombocytes very slightly, produces filtrate containing no detected endotoxin, and is useful in medical application such as hemodialysis and blood filtration or as a permselective membrane used in the pharmaceutical industry and the food industry.

The invention claimed is:

1. A method of preparing a hollow fiber membrane made from a synthetic hydrophobic polymer which holds a copolymer of 2-methacryloyloxyethyl phosphorylcholine and other vinyl-polymerizable monomers on the surface thereof, wherein said copolymer is present in the pores in the inner parts of the membrane only in a low amount and wherein the copolymer is unevenly distributed on the surface of the hollow fiber membrane comprising simultaneously discharging a hollow space inner solution from the inner side of double spinning nozzles and a synthetic polymer solution from the outer side of the double spinning nozzles and immersing the spun yarns into a coagulation bath located below the spinning nozzles, wherein a solution prepared by dissolving 0.001–10 wt % of a copolymer of 2-methacryloyloxyethyl phosphorylcholine and other vinyl-polymerizable monomers is used as the hollow space inner solution.

2. The process according to claim 1, wherein the synthetic polymer of said hollow fiber membrane is selected from the group consisting of polysulfone-based, polycarbonate-based, polyamide-based, polyvinyl chloride-based, polyvinyl alcohol-based, polyallylate-based, polyacrylonitrile-based, polyether-based, polyester-based, polyurethane-based, and polyacrylate-based polymers and mixtures of these polymers.

3. The process according to claim 1, wherein the synthetic polymer of said hollow fiber membrane is a mixture of polysulfone and/or polyether sulfone and polyvinyl pyrrolidone.

4. The process according to claim 1, wherein the synthetic polymer forming thick membrane parts in the hollow fiber membrane is a synthetic polymer having a contact angle in the range of 50° to 100°.

5. The process according to claim 1, wherein the copolymer held on the surface of the membrane has a monomer unit content of 2-methacryloyloxyethyl phosphoryicholine in the range of 0.05 to 0.95.

6. The process according to claim 1, wherein the monomer unit concentration of 2-methacryloyloxyethyl phosphorylcholine on the surface of the membrane is 5 wt % or more.

7. The process according to claim 1, wherein the other vinyl-polymerizable monomer in the copolymer held on the surface of the membrane is at least one compound selected from the group consisting of vinyl pyrrolidone, styrene, and (meth)acrylate derivatives.

8. The process according to claim 7, wherein the (meth)acrylate derivative is a compound selected from the components of the following formulas (1), (2), and (3),

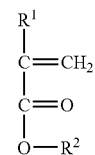

(1)

wherein $R^1$ is a hydrogen atom or a methyl group and $R^2$ is a hydrogen atom or an aliphatic or aromatic hydrocarbon group having 1–20 carbon atoms,

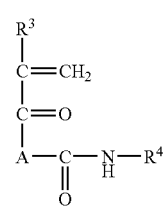

(2)

wherein $R^3$ is a hydrogen atom or a methyl group, $R^4$ is a hydrogen atom or an aliphatic or aromatic hydrocarbon group having 1–20 carbon atoms, and A indicates O or $OR^5O$, wherein $R^5$ is a substituted or unsubstituted alkylene group having 1–10 carbon atoms,

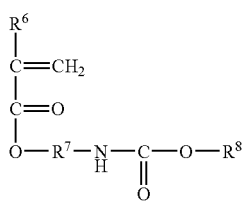

(3)

wherein $R^6$ is a hydrogen atom or a methyl group, $R^8$ is a hydrogen atom or an aliphatic or aromatic hydrocarbon group having 1–20 carbon atoms, and $R^7$ is a substituted or unsubstituted alkylene group having 1–10 carbon atoms.

9. A method of preparing a hollow fiber membrane comprising a synthetic hydrophobic polymer which holds a copolymer of 2-methacryloyloxyethyl phosphorylcholine and other vinyl-polymerizable monomers on the surface thereof, wherein said copolymer is unevenly distributed on the surface of the membrane, and wherein the concentration of the copolymer per unit weight of the membrane (bulk concentration) is 0.001–1.0 wt %, said method comprising simultaneously discharging a hollow space inner solution from the inner side of double spinning nozzles and a synthetic polymer solution from the outer side of the double spinning nozzles and immersing the spun yarns into a coagulation bath located below the spinning nozzles, wherein a solution prepared by dissolving 0.001–10 wt % of a copolymer of 2-methacryloyloxyethyl phosphorylcholine and other vinyl-polymerizable monomers is used as the hollow space inner solution.

10. The process according to claim 9, wherein the synthetic polymer is selected from the group consisting of polysulfone-based, polycarbonate-based, polyamide-based, polyvinyl chloride-based, polyvinyl alcohol-based, polyallylate-based, polyacrylonitrile-based, polyether-based, polyester-based, polyurethane-based, and polyacrylate-based polymers and mixtures of these polymers.

11. The process according to claim 9, wherein the synthetic polymer is a mixture of polysulfone and/or polyether sulfone and polyvinyl pyrrolidone.

12. The process according to claim 9, wherein the synthetic polymer forming thick membrane parts in the hollow fiber membrane is a synthetic polymer having a contact angle in the range of 50° to 10°.

13. The process according to claim 9, wherein the copolymer held on the surface of the membrane has a monomer unit content of 2-methacryloyloxyethyl phosphorylcholine in the range of 0.05 to 0.95 and said bulk concentration of said copolymer is 0.05–0.5 wt %.

14. The process according to claim 9, wherein the other vinyl-polymerizable monomer in the copolymer held on the surface of the membrane is at least one compound selected from the group consisting of vinyl pyrrolidone, styrene, and (meth)acrylate derivatives.

15. The process according to claim 14, wherein the (meth)acrylate derivative is a compound selected from the components of the following formulas (1), (2), and (3),

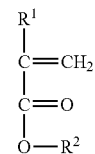

(1)

wherein $R^1$ is a hydrogen atom or a methyl group and $R^2$ is a hydrogen atom or an aliphatic or aromatic hydrocarbon group having 1–20 carbon atoms,

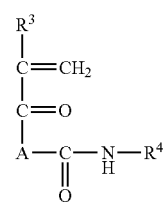

(2)

wherein $R^3$ is a hydrogen atom or a methyl group, $R^4$ is a hydrogen atom or an aliphatic or aromatic hydrocarbon group having 1–20 carbon atoms, and A indicates O or $OR^5O$, wherein $R^5$ is a substituted or unsubstituted alkylene group having 1–10 carbon atoms,

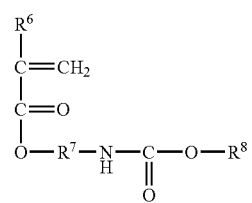

(3)

wherein $R^6$ is a hydrogen atom or a methyl group, $R^8$ is a hydrogen atom or an aliphatic or aromatic hydrocarbon group having 1–20 carbon atoms, and $R^7$ is a substituted or unsubstituted alkylene group having 1–10 carbon atoms.

* * * * *